Figure 2:
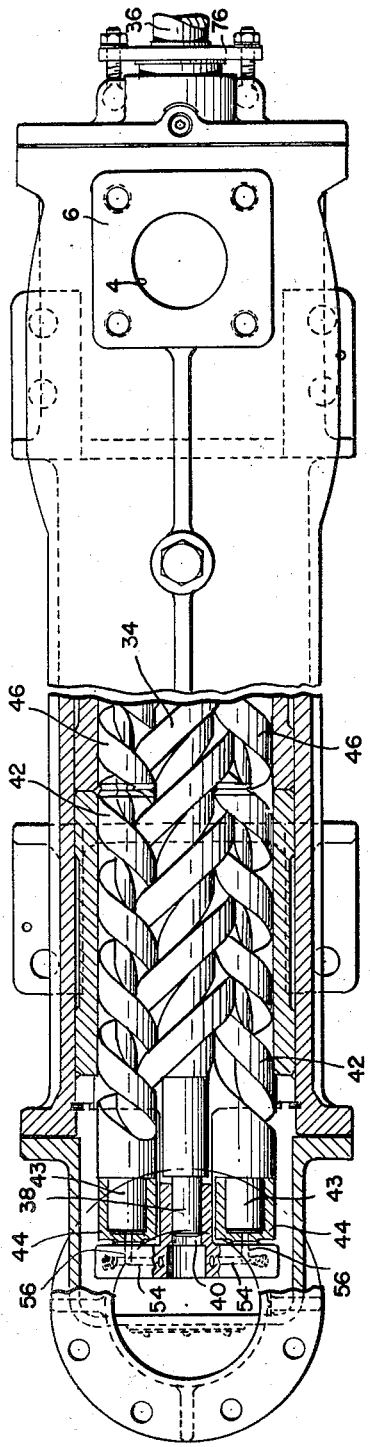

Feb. 9, 1960 M. B. SENNET 2,924,181
SCREW PUMPS OR MOTORS
Filed May 13, 1957

INVENTOR.
MORGAN B. SENNET
BY
ATTORNEYS

United States Patent Office 2,924,181
Patented Feb. 9, 1960

2,924,181

SCREW PUMPS OR MOTORS

Morgan B. Sennet, Erwinna, Pa., assignor to De Laval Steam Turbine Company, Trenton, N.J., a corporation of New Jersey Application May 13, 1957, Serial No. 658,570

5 Claims. (Cl. 103—128)

This invention relates to screw pumps or motors and has particular reference to screw pumps or motors of the type in which intermeshing screws provide chambers which are traversed axially of the screws, the invention being applicable to pumps or motors of this type whether they are positive or non-positive.

In the following for simplicity of description reference will be made to pumps but it will be understood that the invention is applicable to either pumps or motors.

In pumps of the type just mentioned the lengths of the screw assemblies used depends on the requirements on the pump. While a certain minimum length of the assembly, corresponding to a so-called "closure" will, from one purely theoretical standpoint, provide a positive pump, there are in practice required not only running clearances but theoretical sharp edges not only cannot be obtained but are desirably not used in the interest of securing smooth running and avoidance of wear. Accordingly, a screw arrangement which theoretically could be considered positive is not actually such and to secure pumping against very large heads the screw lengths are increased so as to secure in a single pump a larger number of closures, the number of such closures being unlimited, except by practical considerations, when required. This matter of extending screw lengths is also of interest in the case of non-positive pumps, i.e., those which even theoretically are not positive by virtue of the thread numbers.

One object of the present invention is the provision of a pump construction which makes possible the assembly of pumps of various screw lengths utilizing to a major extent parts which may merely be associated end to end to build up various final pumps. The number of closures required determines the length of a power screw and consequently for each screw length a different power screw is necessary. However, the idler screws which mate with the power screw may be made up of individual lengths associated end to end since the drive is directly through the threads and not dependent upon the carrying of torques through a central "shaft." Accordingly, by standardizing on an idler screw section which in itself is sufficient to provide the axially shortest pump, longer pumps may be provided merely by arranging such idlers end to end.

In these screw pumps the screws are enclosed in a housing having a central opening and lobes forming lateral extensions thereof. For example, in the form of pumps most generally used commercially, a power screw having two threads is encased in a central opening which has two lobes each of which encloses an idler, each idler having two threads. Non-positive pumps may be provided by one or more additional idlers enclosed within corresponding additional lobes. The housings may also well be made up of individual sections, each section, for example, corresponding in length to the length of an idler section. Thus these housings may also be built up using duplicate housing elements arranged end to end when longer pumps are desired.

At the ends of the screw assemblies there are provided bearing arrangements which may be the same for various pump lengths. Enclosing the housing sections and bearing elements referred to there is an outer casing having inlet and outlet passages, but since this is not necessarily a costly, accurately machined piece it is convenient to have different casings for different pump lengths, though inlet ends of the casings, constituting covers, may be the same for various sizes of pumps.

The result of the foregoing is that duplicate parts may be kept in stock sized only by conformity to screw diameters and pitches, and if there is a call for a particular pump, these parts may be variously assembled to provide the pumps required.

The present invention not only achieves the foregoing, but has also other advantages such as result in self-alignment of the parts for smooth operation.

Further, in accordance with the invention advantageous means are provided for taking end thrust.

Figure 1:
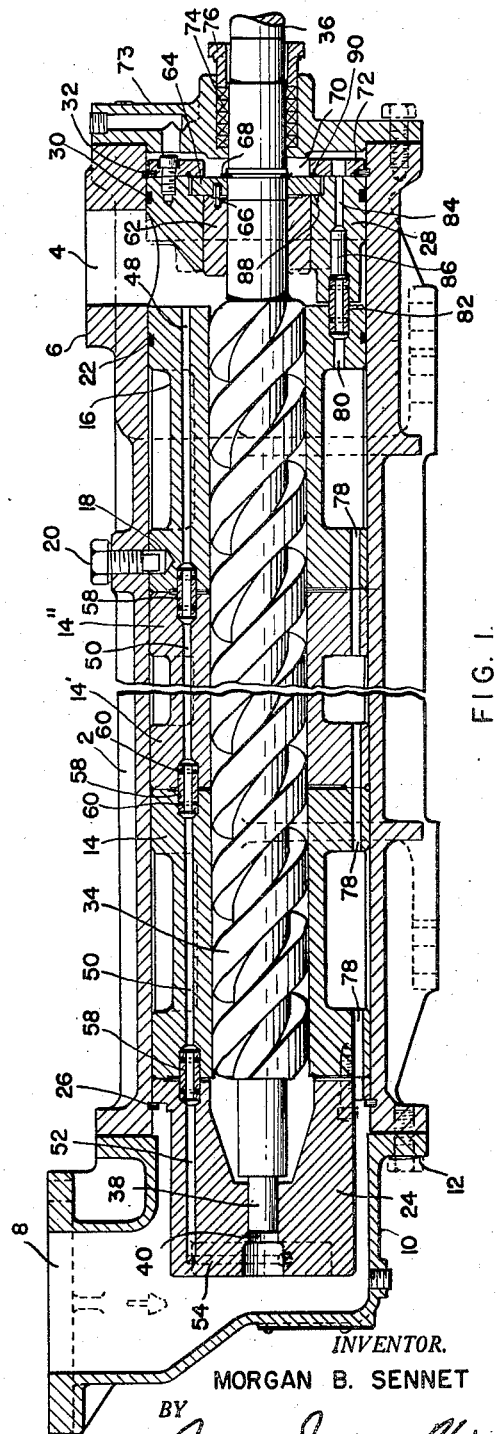

The attainment of the objects of the invention indicated above and of other objects relating to advantageous details of construction will become apparent from the following description read in conjunction with the accompanying drawing, in which:

Figure 1 is an axial section through a pump provided in accordance with the invention, the section being indicated as split in the central portion thereof to show the possibility of lengthening by duplication of parts; and Figure 2 is a view partly in elevation and partly in section taken at right angles to the section at Fig. 1 to show details of construction.

There is indicated at 2 the major portion of a pump casing the length of which varies with the length of the pump, so that for each pump length there is provided a different casing 2. This casing, however, is of relatively simple structure, consisting of a casting which is centrally bored to a uniform diameter and otherwise involves only relatively minor machining operations for its completion. It is more economical to make separate casings for each pump length rather than to make the casings of separate sections which would have to be bolted or otherwise secured together to withstand the very high pressures sometimes encountered.

At its right hand end shown in Figures 1 and 2 the casing 2 is provided with the outlet passage 4 desirably in the form of a cylindrical bore ending at a plane face 6. Provisions are made for the bolting to the face 6 of various types of pipe connections such as may be required for various uses, sealing being effected by the use of O-rings or gaskets in well known fashion and not illustrated.

At the left hand end of the casing 2 there is bolted at 12 a cast cover 10 provided with an inlet passage 8. As will shortly appear, this cover 10 does not take any of the end thrust of the screws and hence no special provisions need be made for securing it to the casing. Desirably the arrangement is such that the cover 10 may be selectively bolted to the casing in any one of four or more angular positions to facilitate association of the pump with piping.

Housing members 14, 14′, 14″ and 16 which may be duplicates or substantial duplicates of each other provide the lobed bores for the reception of the screws. In the shortest pump required there may be only a single one of these housing members; in longer pumps they may be associated end to end to build up the required housing length as indicated at 14, 14′, 14″ and 16, the break in Figure 1 indicating possible repetition though, of course, 14′ and 14″ shown therein might actually relate to the same housing member. At the outlet end of the pump there is located the housing member 16 which is generally similar to the housing members 14 but which has some minor differences resulting from additional machining of a housing member 14. The housing member 16 is prevented from rotating, and also limited against endwise movement in the casing, being provided with an opening 18 into which there projects the screw 20.

The housing member 16 is provided with an annular groove for the reception of an O-ring 22.

At its left hand end the housing assembly includes a thrust bearing element 24 which is provided with a flange arranged to engage a snap ring 26 located in a groove in the interior bore of the casing 2. This snap ring 26 takes the entire left hand thrust which results during operation of the screws within the assemblage of housing members, and it will be noted that this thrust is taken up by the casing 2 and not by any portion of the cover 10.

In the right hand end of the bore of the casing 2 there is located the member 28 which is provided with an annular groove for the reception of an O-ring 30 which seals against the cylindrical bore of the casing. The casing is provided with a groove in which is located a snap ring 32 which takes right hand thrust under discharge pressure of the member 28.

The centrally located power screw is indicated at 34 and has the driving shaft extension 36 at the right hand end thereof and at 38 has an extension running in a bore 40 in the member 24, which bore communicates with the inlet space within the cover 10. Idlers are shown at 42, and for a positive pump there are two sets of these, each idler having two threads if the power screw also has two threads. In the case of a non-positive pump there may be additional sets of idlers, desirably three or four thereof, located in lobes within the housing members. The thread relationships to secure either positive or non-positive pumps are known and need not be discussed herein. Each left hand idler is provided with an extension 43 having a running fit in a cup 44, the cups bearing upon surfaces on flange portions of the member 24. Friction limits rotation of these cups, the idler extensions running freely therein. The idler sections 42 are continued toward the right by idler sections 46 which are the same as 42 with the exception that they may be cut shorter, not requiring extensions such as 43, and being threaded throughout their lengths. The idler sections 46 are provided in a number corresponding to the housing members 14', 14" and 16 and they abut each other at the junctions of the housing members. They engage each other at their ends but need not be connected to be driven together inasmuch as they mate with the power screw and are so angularly located by it that their threads are continuous with those of adjacent idlers.

The idlers are desirably balanced against end thrust by pressure liquid from the outlet chamber. For this purpose the housing member 16 is provided with a passage 48 which is aligned with similar passages 50 in the housing members 14, 14', 14" and with a passage 52 in the member 24. In the last member the passage 52 communicates through passages 54 with further passages 56 which extend toward the right and communicate with similar passages in the bases of the cups 44 so that the liquid under pressure is applied to the extensions 43 of the left hand idlers. This provides both a liquid film and balancing of idler thrust.

Where the radial surfaces of the members 24, 14, 14', 14" and 16 meet, the passages 52, 50 and 48 are enlarged to receive tubes 58 which are externally grooved for the reception of small O-rings to provide packing. The tubes 58 also act to prevent relative rotation between the housing members while at the same time leaving them free for slight self adjusting movements with respect to the power screw. It will be noted that the engaging ends of the idlers are aligned with the abutting surfaces between the various members 14 and that between the member 14" and 16. The result of this arrangement is to eliminate possibility of any binding due to any slight deviation from straightness of the screws.

The engaging surfaces of 24, 14 and 16 are desirably machined smooth, but packing is not required since during operation they are forced tightly against each other by the pressure gradient across the pump whereby any leakage of detrimental amount is prevented.

Shrunk on the shaft 35 is the member 62 with which is associated a ring 64 held on the shaft by a snap ring 68 engaged in a groove in the shaft. The ring 64 is constrained to rotate with the shaft by a pin 66 secured in the member 62 and loosely entering an opening in the ring. The ring 64 is confined in a groove provided by a shoulder of the member 28 and a clamp ring 72 which is secured to the member 28 by screws and serves to clamp the snap ring 32. The ring 64 has a running fit in this groove and by virtue of the thrust exerted on the power screw toward the right there is provided a hydraulic breakdown passage about the periphery of the member 62 which has a close running fit in the bore of member 28 and then about the periphery of the ring 64 so that the space 70 is a low pressure space in comparison with the high pressure space to the left of member 62. A cover 73 bolted to the casing receives the packing 74 which is compressed by the gland 76.

Communicating openings 78 furnish, with clearance regions about the members 14 and 16, for the connection of the inlet chamber at the left hand end of the pump with the region 70. The portion of these passages indicated at 80 in member 16 is enlarged at its right hand end and the member 28 is similarly enlarged to receive a tube 82 which is packed by O-rings to isolate the low pressure passage from the outlet chamber of the pump. A relief valve 86 is located in the passage through the member 28 to insure maintenance of pressure in excess of atmospheric pressure in the region 70 in the event that the inlet pressure drops below atmospheric pressure. The relief valve, of conventional spring-controlled type, is so arranged that it opens to provide flow from chamber 70 to the inlet chamber only if the pressure in chamber 70 exceeds 10 to 15 pounds gauge, the maintenance of this pressure being desirable to insure proper pressure head on the packing 74 but not excess pressure. The pressure in the chamber 70 is derived from the outlet pressure through the hydraulic breakdown previously described.

Spiral grooves 88 and 90 are desirably machined, respectively, in the surface of the member 29 and in the surface of member 72 engaged by the ring 64, the directions of the spirals being such as to oppose liquid flow and thereby build up pressures so that the ring 64 floats between the members 28 and 72 with balancing of the thrust on the power screw due to the pressure gradient between outlet and inlet.

If the construction described is used as a motor, the driving liquid enters at 4 and discharges at 8. Operation is otherwise essentially as described for a pump.

The arrangement described is suitable when large transverse loads are not imposed on the shaft 36. If such loads are involved a roller or ball bearing arrangement is desirably provided inboard of the shaft packing.

What is claimed is:

1. A hydraulic screw device comprising an integral elongated casing, a cover secured to one end thereof and provided with a liquid passage, housing means within said casing, a power screw and at least one idler screw intermeshing with said power screw, said screws rotating in intersecting bores in said housing means, said housing means comprising a plurality of housing members arranged end to end and having their screw-receiving bores aligned, and means limiting movement of said housing members towards said cover, said power screw being unitary and extending through said housing members and provided with a shaft extending externally of said device, and said idler screw being in the form of mechanically independent sections located end to end and individual to said housing members with each of said idler screw sections in engagement with only one of said members.

2. A device according to claim 1 in which said housing means includes means providing thrust bearings to limit endwise movement of said idler screw sections.

3. A device according to claim 2 provided with connections to deliver high pressure liquid to said thrust bearings to balance hydraulic pressure on said idler screws.

4. A hydraulic screw device comprising an elongated casing, housing means within said casing, a power screw and at least one idler screw intermeshing with said power screw, said screws rotating in intersecting bores in said housing means, said housing means comprising a plurality of housing members arranged end to end and having their screw-receiving bores aligned, said power screw being unitary and extending through said housing members and provided with a shaft extending externally of said device, and said idler screw being in the form of mechanically independent sections located end to end and individual to said housing members with each of said idler screw sections in engagement with only one of said members.

5. A device according to claim 4 including means interconnecting said housing members restricting large relative movements but permitting slight relative movements thereof relative to each other.

References Cited in the file of this patent

UNITED STATES PATENTS

| 594,462 | Cook | Nov. 30, 1897 |
| 624,497 | Inglis | May 9, 1899 |
| 1,698,802 | Montelius | Jan. 15, 1929 |
| 1,751,703 | Long | Mar. 25, 1930 |
| 1,762,708 | Allred | June 10, 1930 |
| 1,898,914 | Vickers | Feb. 21, 1933 |
| 2,381,695 | Sennet | Aug. 7, 1945 |
| 2,386,896 | Hill | Oct. 16, 1945 |
| 2,525,619 | Roth et al. | Oct. 10, 1950 |
| 2,590,560 | Montelius | Mar. 25, 1952 |
| 2,590,561 | Montelius | Mar. 25, 1952 |
| 2,816,510 | Jarvis | Dec. 17, 1957 |

FOREIGN PATENTS

| 469,405 | Italy | Mar. 1, 1952 |
| 630,520 | Great Britain | May 19, 1947 |
| 646,344 | Great Britain | May 10, 1948 |
| 813,341 | Germany | July 8, 1949 |